United States Patent [19]
Lehmann et al.

[11] Patent Number: 4,576,420
[45] Date of Patent: Mar. 18, 1986

[54] LINEAR BEARING ARRANGEMENT FOR GUIDING A CARRIAGE IN A STRAIGHT LINE ALONG A GUIDE RAIL

[75] Inventors: Wolfgang Lehmann, Stuttgart; Hans-Walter Aab, Waiblingen, both of Fed. Rep. of Germany

[73] Assignee: Neff Gewindespindeln GmbH, Waldenbuch, Fed. Rep. of Germany

[21] Appl. No.: 594,207

[22] Filed: Mar. 28, 1984

[30] Foreign Application Priority Data

Apr. 12, 1983 [DE] Fed. Rep. of Germany ....... 3313129

[51] Int. Cl.⁴ ............................................ F16C 29/06
[52] U.S. Cl. .................................................... 308/6 C
[58] Field of Search ............. 308/3 R, 3 A, 6 R, 6 A, 308/6 B, 6 C

[56] References Cited

U.S. PATENT DOCUMENTS

| 4,357,056 | 11/1982 | Olschewski et al. | 308/6 C |
| 4,363,526 | 12/1982 | Teramachi | 308/6 C |
| 4,372,623 | 2/1983 | Koschmieder | 308/6 C |
| 4,420,194 | 12/1983 | Asami | 308/6 C |
| 4,427,240 | 1/1984 | Teramachi | 308/6 C |
| 4,428,627 | 1/1984 | Teramachi | 308/6 C |
| 4,441,765 | 4/1984 | Kasai | 308/6 C |

FOREIGN PATENT DOCUMENTS 2136024 1/1972 Fed. Rep. of Germany .
2945594 6/1980 Fed. Rep. of Germany .
2346343 12/1981 Fed. Rep. of Germany .

Primary Examiner—Stuart S. Levy
Assistant Examiner—David Werner
Attorney, Agent, or Firm—Frishauf, Holtz, Goodman & Woodward

[57] ABSTRACT

A linear bearing arrangement for guiding a carriage in a straight line along a guide rail is provided with at least one endless course of balls (3) disposed between the carriage (2) and the guide rail (1). The guide rail has at least one ball race (4) associated with the load-bearing balls of the ball course and extending in the longitudinal direction of the rail. At least one elongated track carrier element (8), having at least one ball race (16), as well as at least one diversion and return track for the unloaded balls are disposed in the interior of the carriage.

In order to assure great accuracy in the guidance of the carriage on the guide rail as well as to assure simple assembly and convenient replacement of worn parts, the arrangement is selected such that the track carrier element (8) is combined into one subassembly with diversion (9) and return elements (10,10a,11,11a) containing the diversion and return track; a plate (12) holds the balls (3) facing the rail (11) captive. The subassembly is fitted into the carriage (2) by engaging, fitting surfaces (15,18) and retained by end plates (33).

28 Claims, 10 Drawing Figures

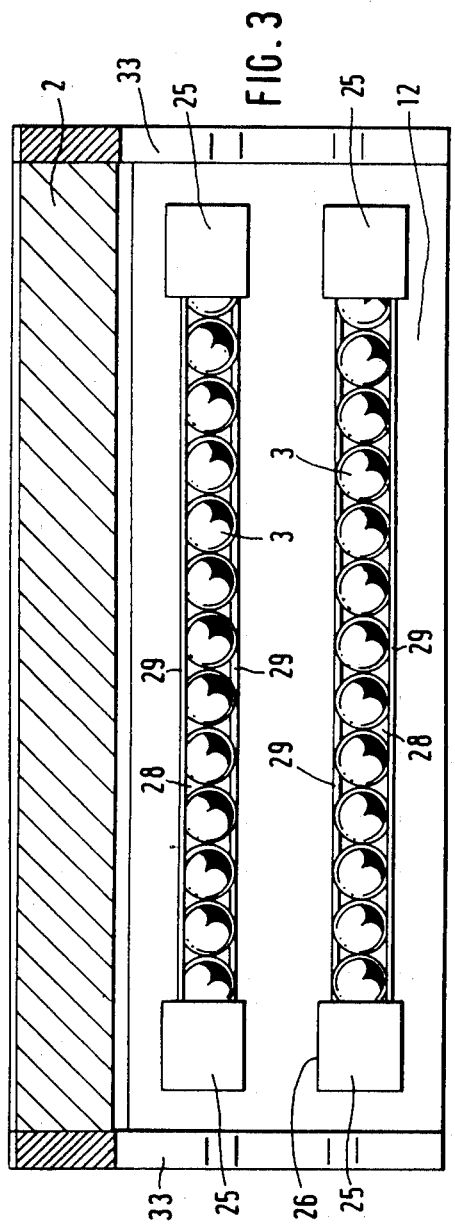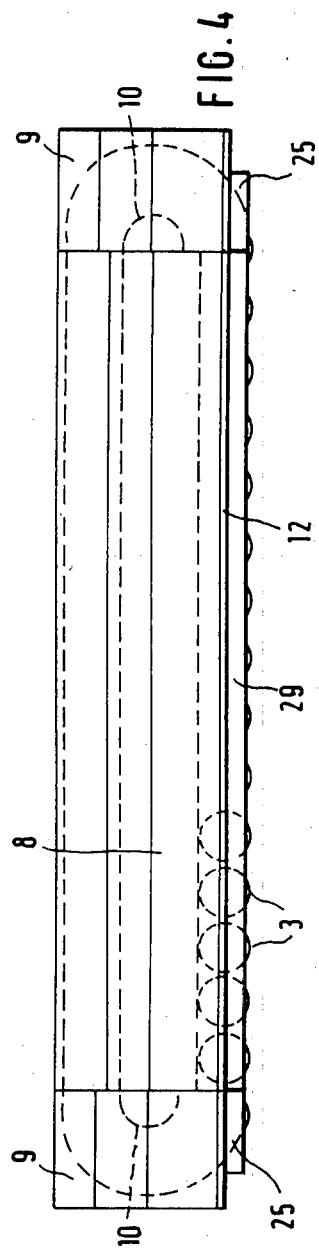

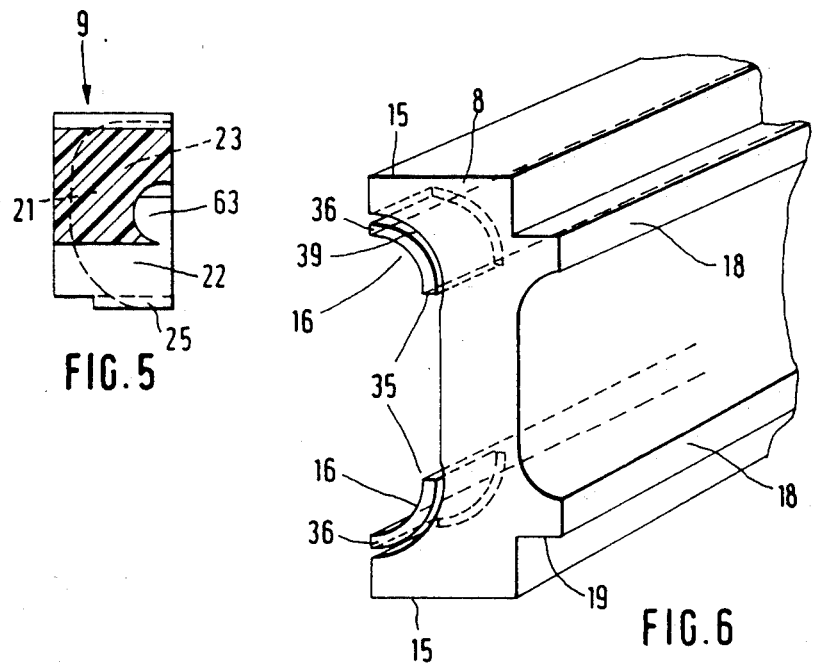
FIG. 5
FIG. 6
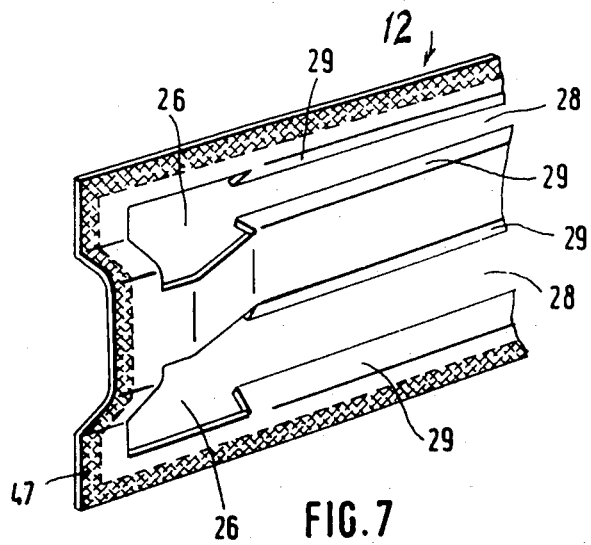
FIG. 7

LINEAR BEARING ARRANGEMENT FOR GUIDING A CARRIAGE IN A STRAIGHT LINE ALONG A GUIDE RAIL

Reference to related application assigned to the assignee of the present invention, by the inventors hereof, the disclosure of which is hereby incorporated by reference: U.S. Ser. No. 594,129, filed Mar. 28, 1984, LEHMANN and Aab entitled "BEARING ARRANGEMENT FOR GUIDING A CARRIAGE IN A STRAIGHT LINE ALONG A GUIDE RAIL".

The present invention relates to a linear bearing arrangement for guiding in a straight line along a guide rail, having at least one endless course of balls disposed between the carriage and the guide rail. The guide rail has at least one ball race that is associated with the load-bearing balls in the ball course and extends in the longitudinal direction of the guide rail. At least one track element, having at least one ball race, as well as at least one diversion and return track for the unloaded balls are disposed in the interior of the carriage.

Background.

In known linear bearing arrangements of this kind (German Patent Disclosure Documents 21 36 024 and 29 45 594), four parallel ball races are machined directly into the carriage, which is made of steel in one or more pieces and embraces the guide rail on all sides or in the form of a letter C. Since the ball races, which are adapted in their profile to the outline of the balls, must be ground to relatively close tolerances, the fabrication of a one-piece carriage having ball races of this kind is not simple, especially if the dimensions are small. Multiple-piece carriages, however, cause an increased manufacturing expense and also require that further provisions be made for fixing the parts carrying the ball races in an accurate position relative to one another and to the guide rail. Since the surface of the ball races must be hardened, the carriage or its parts must in that case also be hardened, making it more difficult or impossible for the customer later to provide attachment bores or the like for elements of the machine that must be connected to the carriage. The ball races also undergo a certain wear; if it exceeds the tolerable amount, then the entire carriage must be replaced.

It is also known (German Pat. No. 23 46 343) to provide two track elements, each formed as a strip-like shell, and locate one each at a side of the central longitudinal plane of the guide rail, each track element carrying at least two tracks for the balls. This has the advantage that each track element can be manufactured and machined, as well as replaced in the event of wear, separately from the carriage. To this end, however, the carriage must be removed by removing lids that contain the diversion tracks; in this operation, as in the case of removing the carriage from the guide rail, retention of the balls of the ball courses, being loose parts, are problematic.

The Invention.

It is an object of the invention to provide a linear bearing arrangement which is universally applicable and is distinguished by highly accurate guidance of the carriage on the guide rail, and in which simple assembly and convenient replacement of worn parts are assured.

Briefly, the track element and the diversion and return elements are combined into one subassembly, in which the balls are retained in a captive manner and which is fitted into the carriage.

The subassembly, being a unified whole without any loose parts, is simply fitted into a corresponding recess in the carriage, in the manner of a circular roller bearing insert. The carriage therefore does not contain any hardened ball races or the like and may be designed entirely with a view to the requirements of a given intended use. For instance, it may be embodied as a cut-off part of an extrusion profile, which may also be of lightweight metal. The bearing inserts may be kept on hand and inserted or replaced as needed by the user himself, without requiring particular skill or occasioning any very great expenditure for assembly.

In one preferred form of embodiment, the subassembly includes a retaining plate mounted on the track element and having at least one longitudinal slit that with its peripheral parts retains the balls located on the ball race of the track element. In this embodiment, a seal that seals off the ball guidance track of the track element laterally from the outside can be introduced between the retaining plate and the track element, in order to prevent the escape of lubricant in the case where the ball race and the balls are lubricated with oil or grease. At the same time, this prevents dirt from getting into the ball race of the subassembly, and on the other hand a lifetime lubrication can then be provided, if necessary, as well.

A particularly compact subassembly structure is attained if the return track is disposed on the side of the track element remote from the ball race. It is also advantageous if two diversion elements, each including one substantially U-shaped diversion track, are connected to the track element at its front end, with the return element extending between them, the latter being embodied for instance in the form of a tube or pipe segment. By the appropriate selection of the length of the track element, which is for instance cut from a profiled part of sufficient length and onto which the diversion elements are simply placed at its end, the subassembly can then be adapted to various load conditions without having to keep on hand a great number of different individual parts for different load conditions.

The diversion elements suitably include profiled grooves forming the diversion track, which, except for a ball entry and exit opening are closed on the open side by a diversion part that is profiled to match the diversion track and can be fitted into place or mounted in place. The arrangement can then be such that the two diversion parts of one subassembly are interconnected by an integral rib or projection, with the complete diversion part embodied such that it can be mounted laterally on the track element. Then at the same time the diversion parts can be connected with the retaining parts that grasp the track element; this results in particularly simple constructions, if the two diversion elements and the return element are connected with one another in a positively engaged manner.

The parts of subassembly, in one suitable form of embodiment, are releasably connected with one another by means of at least one retaining element, which may be a substantially U-shaped, resilient retaining bracket encompassing the diversion elements. The two diversion elements and the retaining plate may furthermore have locking elements, the diversion elements and the track element being held axially together in a positively engaged manner by the retaining plate. Finally, the diversion elements may each have on their back sides a receiving groove receiving the retaining bracket, so that the retaining bracket itself is disposed in countersunk fashion in the subassembly.

Since the diversion tracks and the return tracks for the balls are embodied in their own elements of the subassembly representing the roller bearing insert, rather than in parts of the carriage, the diversion elements and/or parts and the return element can all be made of plastic. Not only does this facilitate manufacture and reduce manufacturing costs, but above all it makes it possible to assure noise-free operation of the linear bearing arrangement.

The track element made of steel and having at least one hardened ball race advantageously has guide faces that cooperate with corresponding faces in the interior of the carriage and that assure a precisely correct positioning of the element inside the carriage. These guide faces may be located on at least one ledge, disposed on the side of the track element remote from the ball race. Corresponding guide faces may additionally be provided laterally on the track element. Because of this ledge, the return element located on the same side of the track element can also be supported laterally.

To attain play-free travel of the carriage on the guide ledge, the loaded balls are as a rule introduced with initial stress between the ball races disposed in associated pairs in the guide rail and a given track element. In order to assure a continuous buildup or dispersal of this initial stress on the balls upon entry into or exit from the ball races, respectively, the track element may be embodied with a resilient zone on its end face in the vicinity of the entry or exit of the balls into or out of the ball race. In a preferred embodiment, this resilient zone is respectively embodied by an elastically yielding lip connected with the track element and defined as needed by a groove disposed on the end face of the track element.

The subassembly that embodies a roller bearing insert is advantageously fitted into a corresponding recess in the carriage and held therein axially by means of at least one lid mounted laterally on the carriage. A seal may be introduced between the lid and the carriage. The carriage itself may, as mentioned earlier herein, be unhardened, and it may have angular connection faces, depending on the requirements of a given intended use.

The subassembly embodying the roller bearing insert may be installed in any desired linear bearing arrangements that include a guide rail or even generally include some machine element having a machined track for the balls and a carriage or trolley movable relative thereto. On the other hand, should it be important to provide a linear bearing arrangement equipped for the guided, rotationally secured linear movement of a carriage suited to bearing great loads, then it is advantageous to use subassemblies that include two courses of balls. Two ball races are then correspondingly embodied on the track element, while the parallel ball races associated with the guide rail of T-shaped or double-T-shaped cross section are each disposed on the guide rail in the transitional zone between two adjacent shanks, located one above the other, of the guide rail. To attain a substantially uniform load-bearing capacity in all directions, it is appropriate for the line of contact between the ball race and the load-bearing balls to extend at an angle of 45° with respect to the central longitudinal plane of the track element, in the case of both ball races of a given track element.

DRAWING

FIG. 3 shows the linear bearing arrangement of FIG. 2, cut along the line III—III of FIG. 2, in a side view with the guide rail omitted from the drawing, showing a subassembly embodying a roller bearing insert;

FIG. 4 shows the subassembly of FIG. 3 in a side view;

FIG. 5 shows a diversion element of the subassembly of FIG. 4, in a sectional view taken along the line IV—IV of FIG. 1 and seen from the side;

FIG. 6 shows a track element of the linear bearing arrangement of FIG. 1, shown in a fragmentary perspective view;

FIG. 7 shows the retaining plate of a subassembly, embodying a roller bearing insert, of the linear bearing arrangement according to FIG. 1, in a different form of embodiment, in a fragmentary perspective view and on a different scale;

DESCRIPTION OF THE PREFERRED EMBODIMENTS

Figure 1:
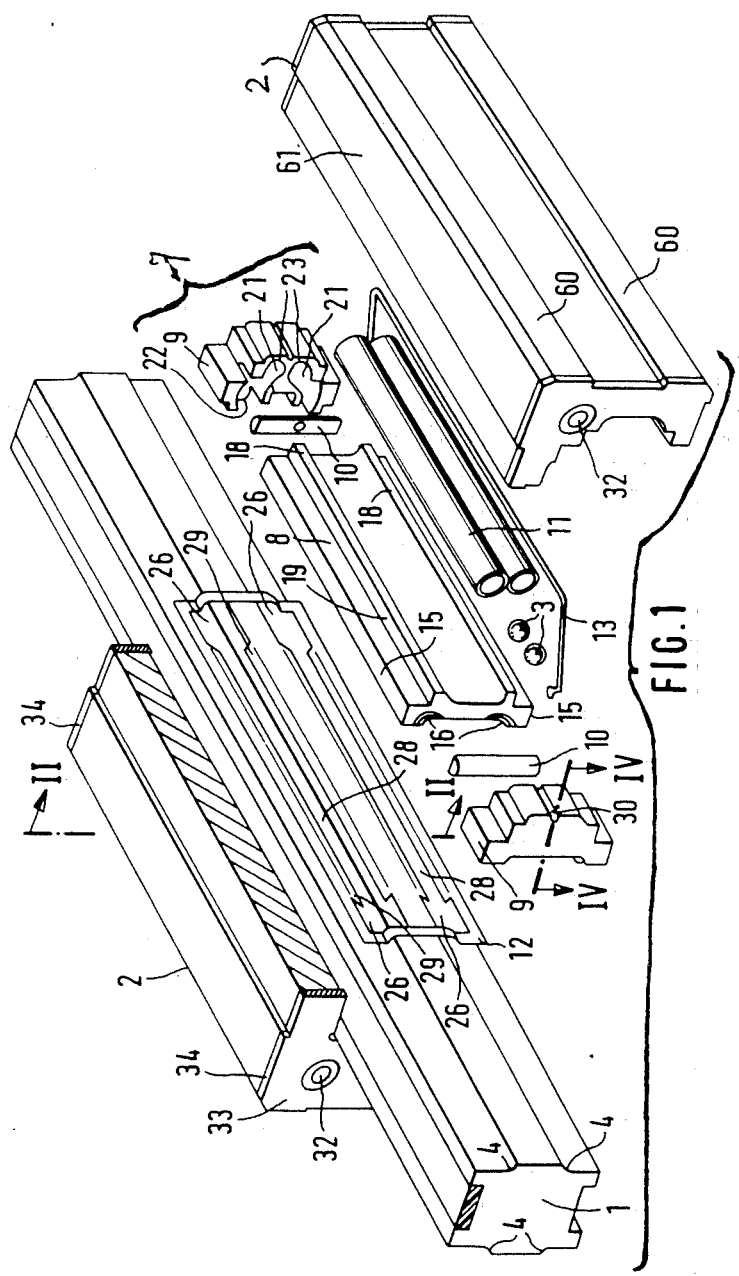
FIG. 1 is an exploded view in perspective of a linear bearing arrangement according to the invention, showing the carriage in a section taken along the line I—I of FIG. 2.
Figure 2:
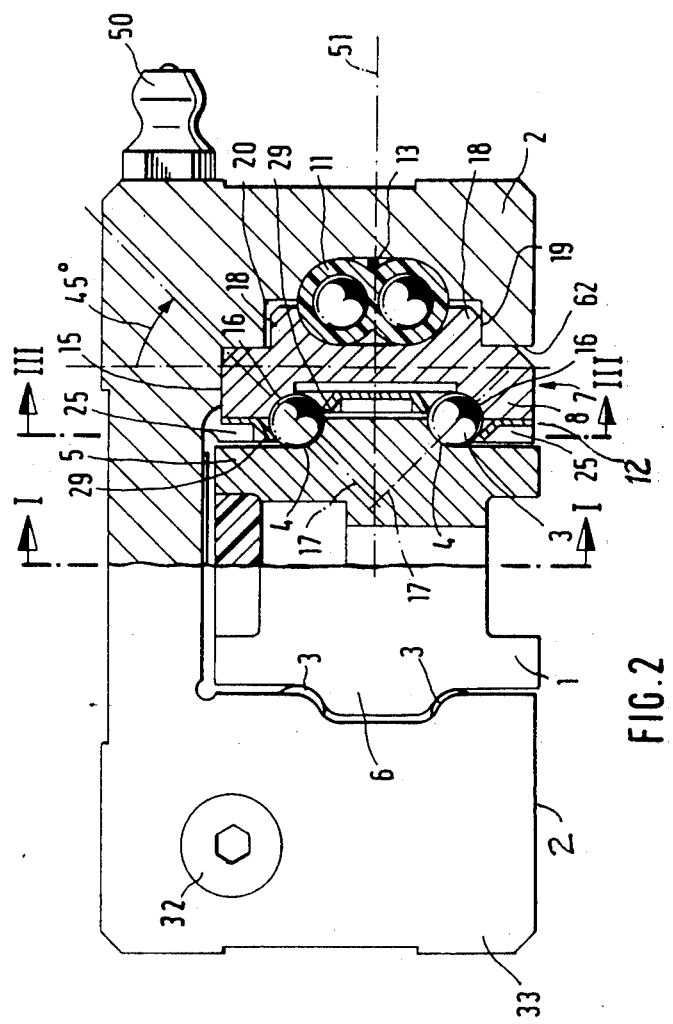
FIG. 2 shows the linear bearing arrangement of FIG. 1 in the assembled state, partially cut along the line II—II of FIG. 1, seen in an end-on view and to a different scale.

The linear bearing unit shown in FIGS. 1, 2 has a solid, double-T-shaped guide rail 1, on which a carriage 2 encompassing the guide rail 1 and having a C-shaped cross section is longitudinally guided in a straight line. Four endless courses of balls are disposed between the carriage 2 and the guide rail 1, supporting the carriage 2 on the guide rail 1. The guide rail 1 has four parallel longitudinal ball guide tracks, or ball races 4, adapted in profile to the balls 3; as best seen in FIG. 2, these ball races 4 are respectively disposed in the vicinity of the transition between two adjacent shanks 5, 6, located one above the other, of the guide rail 1. The ball races 4 are hardened; the guide rail 1 is made of steel.

In the interior of the carriage 1, at either side of the guide rail 1, two subassemblies 7 (of which only one is seen in FIGS. 1 and 2) serving as roller bearing inserts are located, each of which has one elongated, ledge-like track carrier element 8, two diversion elements 9 with two diversion parts 10, one return element 11 and one ball retaining plate 12, as well as a holding or retention bracket 13 formed as a wire ball and holding together the above-mentioned parts of the subassembly 7 together as a single, captive unit.

The track carrier element 8, made of steel, is formed as a flat ledge or strip, defined at the outside by lateral parallel guide faces 15, and on the front side of which two hardened, machined ball races 16 are provided, the profile of which is adapted to the balls 3. The ball races 16, like the ball races 4 of the guide rail 1, are disposed in such a manner that the lines of contact shown at 17 in FIG. 2 between the ball race and the load-bearing balls 3 extend at an angle of 45° relative to the central longitudinal plane of the track element 8. As a result, regardless of the direction in which the load is applied, an approximately uniform load transfer between by the carriage 2 and rail 1 is always obtained. On the side opposite the ball races 16, the track element 8 is provided with two parallel ledges 18, on which guide faces 19 are likewise formed. The guide faces 19 and the guide faces 15 of the track element 8 cooperate with corresponding guide faces in the recesses 20 of the carriage 2 that receive the subassembly 7 in such a manner that the track element 8, and thus the subassembly 7, are each fixed in the carriage 2 in an exactly correct position.

The track element 8 may be cut off from a longer profiled rail in accordance with the length of subassembly that may be required for a given use. Its ball races 16 are freely accessible for machining and this applies equally to the guide faces 15, 19, so that these parts can be manufactured with high precision.

The two diversion elements 9 (FIGS. 1, 5, 9) are made of plastic and mounted on the ends of the track element 8. Each diversion element 9 includes two grooves 21 forming a substantially U-shaped continuous path for the balls. The grooves 21 located beside one another are closed by a substantially semi-cylindrical diversion part 10 (FIGS. 1, 4), except for a ball entry opening 22 located at the level of the ball race 16 associated with it on the track element 8 and a ball exit opening 23 that emerges on the rear side of the track element 8. The diversion part 10 is introduced into a corresponding recess 63 (FIG. 5) of the diversion element 9 and rests with its plane face against the adjacent end face of the track element 8.

A return element 11 is located on the rear side of the track element 8 remote from the ball races 16. Element 11 is made of a double pipe, likewise of plastic material. It includes two ball return tracks, which are continuous with the ball exit openings 23 of the diversion elements 9. The return element 11 is retained laterally between the two ledges 18.

Each of the diversion elements 9, which in cross section are embodied approximately like the profiled shape of the track element 8, carries on its front side two extensions 25 (FIG. 4), which when the subassembly 7 is in the assembled state engage correspondingly shaped rectangular openings 26 (FIG. 7) of the retaining plate 12 that is mounted onto the front of the track element 8. The extensions 25 are provided with detent ledges 27 (FIG. 9), which grip the rim of the recesses 26 from behind and thereby hold the retaining plate 12 in captive fashion.

The ball retaining plate 12 (FIG. 7) has two parallel longitudinal slits 28, ending in two respective recesses 26, these slits 28 being associated with the two ball races 16 of the track element 8. By means of the peripheral parts 29 of these slits 28, which are curved to correspond with the curvature of the balls, the load-bearing balls 3 located on the associated ball race 16 of the track element 3 are retained such that they are movable yet still are held captive.

Finally, on the rear side of the two diversion elements 9 (FIG. 1), a receiving groove 30 for the wire bracket or bail 13 is provided, which holds together the two diversion elements 9, which are axially fixed to the track element 8 by means of the retaining plate that cooperates with the extensions 25, and the return element 11.

Thus all the described parts are connected together to form a unitary subassembly 7, in which the balls 3 are held captive.

The two subassemblies 7, when the apparatus is assembled, are pushed in from the side into the recesses 20 of the carriage 2 and axially fixed by means of two lids 33 mounted at the end face side onto the carriage 2 and secured be means of countersunk screws 32 (FIG. 2). Between each lid 33 and the carriage 2, a seal indicated at 34 in FIG. 1 may be provided.

The load-bearing balls 3 of each endless ball course, located between the respective ball races 4, 16 associated in pairs with one another, are under initial stress, so that a play-free guidance of the carriage 2 on the guide rail 1 is assured. In order to assure a continuous buildup or dissipation of the initial stress on the balls during their entry into or exit from the loaded zone, the track element 8 is formed (see FIG. 6) in the vicinity of its two end faces with respective resilient zones 35. To this end, a lip 36 is provided in each resilient zone 35, the lip being created by cutting a groove 39 substantially in the form of an arc of a circle into the end faces of the track element 8, the depth of this groove 39 being selected such that the required length of the elastic zone 35 is produced. After they emerge from the elastic zone 35, the balls 3 are directed in the associated diversion element 9 through the groove 21 to the rear side of the track element 8 and into the return element 11, through which, relieved of their load, they travel to the groove 21 of the other diversion element, this groove forming the diversion track. By means of this groove 21, the balls are directed into the elastic zone 35 at the entrance to the track element 8.

Figure 8:
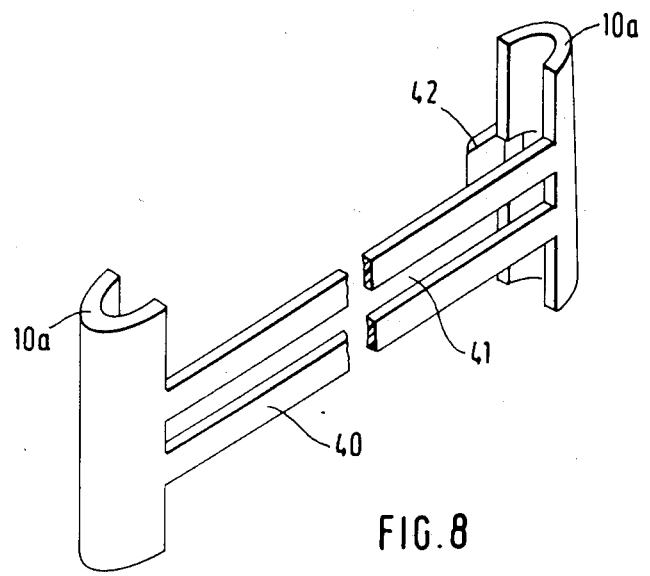
FIG. 8 shows the diversion parts for the retaining plate of FIG. 7, in a perspective view.
Figure 9:
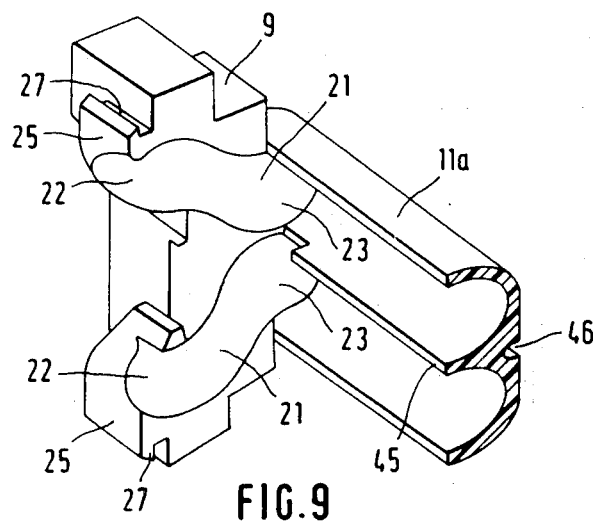
FIG. 9 shows a combined diversion and return element for the retaining plate of FIG. 7, in a fragmentary perspective view.
Figure 10:
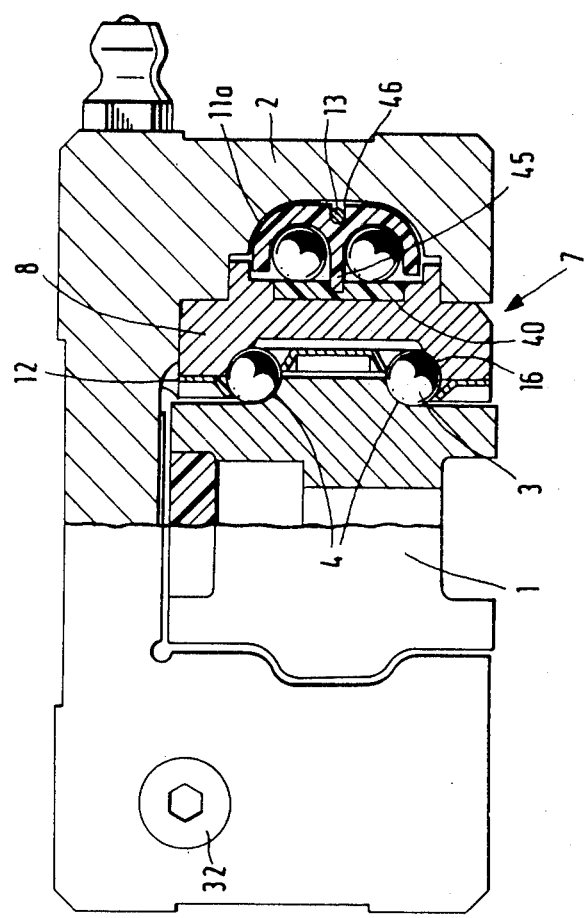
FIG. 10 shows the linear bearing unit containing the parts shown in FIGS. 7-9, in partial top view and section.

While in the form of embodiment shown in FIGS. 1, 2 the diversion elements 9, the diversion parts 10 and the return element 11 are embodied as separate plastic parts, in the form of embodiment shown in FIGS. 8–10, the two diversion parts 10a, which are approximately horseshoe-shaped in cross section, are interconnected by means of a rib 40, which contains a longitudinal slit 41.

On the side opposite the rib 40, two retaining tabs or noses 42 are molded onto the diversion parts 10a.

The diversion elements 10 that are interconnected by means of the rib 40 are pushed laterally in the manner of a bracket onto the track element 8, the retaining noses 42 thereby embracing the track element 8. The entire structure is made of plastic material.

The two diversion elements 9 can also be connected in one piece with the return element 11a (FIG. 9) which, as shown, is formed with a double groove; this structure too is entirely of plastic material. The return element 11a has a central longitudinal rib 45 located between the two return tracks; in the assembled state, this rib 45 is introduced into the longitudinal slit 41 of the rib 40 (FIG. 8). As may be seen in FIG. 10, the ball return tracks are then defined on the one side by the rib 40 and on the other by the groove-like return element 11a.

The entire structure is again held together by the wire bail or bracket 13, which is accommodated in a receiving groove 46 (FIG. 10) on the rear side of the return element 11a to be recessed therein.

The advantage of this form of embodiment is, first, that it has fewer separate individual parts for diverting and returning the balls, and, second, that the ball diversion and return tracks merge seamlessly into one another.

The retaining bracket 12 can finally have a soft seal 47 on its rim, for instance sprayed on, as shown in FIG. 7. When the retaining plate 12 is in place on the track element 8, this seal 47 seals off the ball races 16 in a lubricant-tight manner from the outside. For the purpose of lubrication, the carriage 2 may be equipped with lubricating nipples 50 (FIG. 2) associated with the subassemblies 7 and leading into the recess 20. On account of the seal 47, however, it is even possible for each subassembly 7 to be provided with a lifetime seal.

In the exemplary embodiments described, each subassembly 7 includes two endless courses of balls, with which two parallel ball races 16 of the track element 8 are associated. In principle, however, other forms of embodiment in which each subassembly 7 has merely a single course of balls and one associated ball race 16 are also conceivable. A (half-) subassembly 7 of this kind is attained in a simple manner by dividing the subassembly 7, as shown in FIG. 2, in two along the line 51 shown there. The subassemblies 7 can be used as roller bearing inserts, whether in the single-course or double-course realization, for various kinds of carriages and guide rails, and the guide rail formed as part of be a machine element on which a corresponding ball race is disposed.

The introduction opening 62 (FIG. 2) of the C-shaped carriage 2 is so wide that with the subassemblies 7 removed the carriage 2 can be lifted above the guide rail 1. Then the subassemblies 7, which are defined by straight sides, are pushed laterally into the recesses 20 of the carriage 2, and then the lids 33 are screwed on.

We claim:

1. Linear bearing arrangement for guiding an elongated carriage (2) in a straight line along a guide rail (1), having an endless course of balls (3) disposed between the carriage and the guide rail, wherein the guide rail (1) has at least one ball race (4) for rolling contact with load bearing balls of the ball course and at least one longitudinal track element (7) is provided, having at least one load bearing ball race (16) and at least one diversion and return track (11, 11a) for unloaded balls secured to the elongated carriage (2), and wherein the carriage (2) comprises an essentially C-shaped structure which fits over and in part around and encompassing the guide rail (1);

the track element (7) comprises a subassembly including an elongated track carrier element (8) formed with the load bearing ball race or track (16) facing the ball race (4) on the rail (1), and the diversion and return track includes a return track guide means (11, 11a) located remote from the load bearing ball race of the track (16);

a diversion track guide means (9, 10) located at each of the ends of the carrier element and diverting the balls from the load bearing ball race or track to the return track guide means;

and means (12, 11, 11a) for captively retaining the balls on the track carrier element including a return track ball return structure, extending longitudinally of the return track, said structure, at least in part, circumferentially surrounding the balls (3) in the subassembly;

wherein said track element subassembly (7) of the track carrier elements (8), the diversion track guide means (11, 11a) and the ball retention means (12, 11, 11a) is retained in the carriage structure; and wherein the ball return structure comprises at least one pipe element.

2. Bearing arrangement according to claim 1, wherein the means (12) for captively retaining the balls on the track carrier element (8) comprises a retaining plate (12) formed with at least one longitudinal slit (28) and peripheral parts (29) adjacent the slit to retain the balls (3), the plate (12) being located on the carrier track element (8) on the side thereof in which the load bearing ball race or track (16) is formed.

3. Bearing arrangement according to claim 2, further including a seal (47) inserted between the retaining plate (12) and the track carrier element (8) to seal the load bearing ball race or track (16) of the track carrier element laterally from the outside.

4. Bearing arrangement according to claim 1, wherein the diversion track guide means (9) at the ends of the carrier elements each include a substantially U-shaped diversion track;

and the return track guide means is positioned between the diversion elements (9).

5. Bearing arrangement according to claim 1, including a generally U-shaped resilient retaining bracket or bail (13) fitting around the diversion track guide means and over the elongated track carrier element, and retaining the subassembly in assembled condition.

6. Bearing arrangement according to claim 2, wherein the diversion track guide means (9) and the retaining plate (12) are formed with interlocking projection-and-recess means (25) for retaining the diversion track guide means and the retaining plate (12) on the track carrier element (8) in a positively engaged connection.

7. Bearing arrangement according to claim 1, wherein at least one of: the diversion track guide means; the return track guide means (11, 11a) are made of plastic material.

8. Bearing arrangement according to claim 1, wherein the track carrier element (8) is formed with guide faces (19, 15) and the carriage (2) is formed with cooperating, matching faces (62) in the interior of the C-shaped structure.

9. Bearing arrangement according to claim 8, wherein the track carrier element (8) is formed with a ledge (18) on which the guide faces (19) are located, said ledge being located at the side of the track element remote from the load bearing ball race (16).

10. Bearing arrangement according to claim 9, wherein at least part (11) of the return track guide means is supported laterally by the ledge (18).

11. Bearing arrangement according to claim 1, wherein the track carrier element (8) is formed with a resilient zone (35) in at least one of the end regions of the elongated load bearing track (16) thereof to facilitate rolling interchange of balls between the load bearing race and the diversion track guide means.

12. Bearing arrangement according to claim 11, wherein the resilient zone (35) comprises an elastically yielding lip (36) coupled to the track element (8).

13. Bearing arrangement according to claim 1, including at least one lid (33) mounted laterally on the carriage (2), and closing off the carriage after assembly of the subassembly (7) by insertion into a corresponding recess (20) within the C-shaped structure of the carriage, and for axially holding the subassembly (7) within the carriage.

14. Bearing arrangement according to claim 1, wherein the carriage (2) comprises non-hardened material and is formed with angular connection faces (60, 61) at the outside of the C-shaped structure.

15. Bearing arrangement according to claim 1, wherein the subassembly (7) comprises two ball courses;
two load bearing ball races (16) are located on the track carrier element (8);
and wherein the rail (1) is of T-shaped or double-T-shaped cross section having load bearing ball races (4) located thereon, positioned in the transitional zone between adjacent shanks (5, 6) of the T or double-T-shaped rail.

16. Bearing arrangement according to claim 15, wherein the load bearing ball races (4) on the rail (1) and the load bearing ball races on the track carrier element (8) define a pair of cooperating ball races;
wherein the line of contact between the load bearing balls of any pair on the rail, and on the track carrier element, respectively, extends at an angle of 45° with respect to the longitudinal central plane of the track element (8);
and the lines of contact of the respective pairs are converging.

17. Bearing arrangement according to claim 15, wherein two subassemblies (7) are located within the opening of the C-shaped carriage structure (2), the subassemblies being located on opposite sides of the guide rail (1);
and wherein the guide rail is formed with corresponding ball races (4) on opposite sides thereof.

18. Linear bearing arrangement for guiding an elongated carriage (2) in a straight line along a guide rail (1), having an endless course of balls (3) disposed between the carriage and the guide rail, wherein
the guide rail (1) has at least one ball race (4) for rolling contact with load bearing balls of the ball course and
at least one longitudinal track element (7) is provided, having at least one load bearing ball race (16) and at least one diversion and return track (11, 11a) for unloaded balls secured to the elongated carriage (2), and
wherein
the carriage (2) comprises an essentially C-shaped structure which fits over and in part around and encompassing the guide rail (1);
the track element (7) comprises a subassembly including an elongated track carrier element (8) formed with the load bearing ball race or track (16) facing the ball race (4) on the rail (1),
and the diversion and return track includes a return track guide means (11, 11a) located remote from the load bearing ball race of the track (16);
a diversion track guide means (9, 10) located at each of the ends of the carrier element and diverting the balls from the load bearing ball race or track to the return track guide means;
and means (12, 11, 11a) for captively retaining the balls on the track carrier element including a return track ball return structure, extending longitudinally of the return track, said structure, at least in part, circumferentially surrounding the balls (3) in the subassembly;
wherein said track element subassembly (7) of the track carrier elements (8), the diversion track guide means (11, 11a) and the ball retention means (12, 11, 11a) is retained in the carriage structure; and
wherein the ball return structure comprises an elongaged double-trough structure (11a) and a rib (45) separating individual troughs of the double-trough structure.

19. Bearing arrangement according to claim 18, including interlocking means (40, 41, 45) interlocking the diversion parts (10a) and the return track guide means (11, 11a).

20. Bearing arrangement according to claim 18, wherein the means (12) for captively retaining the balls on the track carrier element (8) comprises
a retaining plate (12) formed with at least one longitudinal slit (28) and peripheral parts (29) adjacent the slit to retain the balls (3), the plate (12) being located on the carrier track element (8) on the side thereof in which the load bearing ball race or track (16) is formed.

21. Bearing arrangement according to claim 18, including a generally U-shaped resilient retaining bracket or bail (13) fitting around the diversion track guide means and over the elongated track carrier element, and retaining the subassembly in assembled condition.

22. Bearing arrangement according to claim 20, wherein the diversion track guide means (9) and the retaining plate (12) are formed with interlocking projection-and-recess means (25) for retaining the diversion track guide means and the retaining plate (12) on the track carrier element (8) in a positively engaged connection.

23. Bearing arrangement according to claim 18, wherein at least one of: the diversion track guide means (9); the return track guide means (11, 11a) are made of plastic material.

24. Linear bearing arrangement for guiding an elongated carriage (2) in a straight line along a guide rail (1), having an endless course of balls (3) disposed between the carriage and the guide rail, wherein
the guide rail (1) has at least one ball race (4) for rolling contact with load bearing balls of the ball course and
at least one longitudinal track element (7) is provided, having at least one load bearing ball race (16) and at least one diversion and return track (11, 11a) for unloaded balls secured to the elongated carriage (2), and
wherein
the carriage (2) comprises an essentially C-shaped structure which fits over and in part around and encompassing the guide rail (1)
the track element (7) comprises a subassembly including an elongated track carrier element (8) formed with the load bearing ball race or track (16) facing the ball race (4) on the rail (1),
and the diversion and return track includes a return track guide means (11, 11a) located remote from the load bearing ball race of the track (16);
a diversion track guide means (9, 10) located at each of the ends of the carrier element and diverting the balls from the load bearing ball race or track to the return track guide means;
and means (12, 11, 11a) for captively retaining the balls on the track carrier element including a return track ball return structure, extending longitudinally of the return track, said structure, at least in part, circumferentially surrounding the balls (3) in the subassembly;

wherein said track element subassembly (7) of the track carrier elements (8), the diversion track guide means (11, 11a) and the ball retention means (12, 11, 11a) is retained in the carriage structure; and wherein the diversion track guide means (9) comprises a block (9) formed with profiled grooves (21) defining at least part of the diversion track;

separate diversion parts (10, 10a) are provided, profiled in accordance with the diversion track, located against the open side of the profiled grooves to close the profiled grooves (21); and wherein a connecting rib (40) is provided interconnecting two diversion parts (10a) at the respective ends of the elongated track carrier element (8), the diversion parts and the connecting rib (40) forming an integral, unitary structure, mounted on the track carrier element (8).

25. Bearing arrangement according to claim 24, including retaining noses (42) formed on the diversion parts for gripping around a portion of the track carrier element (8).

26. Bearing arrangement according to claim 24, wherein the diversion track guide means (9) and the return element (10a) form an integral interconnected structure.

27. Bearing arrangement according to claim 24, wherein at least one of: the diversion track guide means (9); the return track guide means (11, 11a); the diversion parts (10, 10a) are made of plastic material.

28. Bearing arrangement according to claim 24, wherein the track carrier element (8) is formed with a resilient zone (35) in at least one of the end regions of the elongated load bearing track (16) thereof to facilitate rolling interchange of balls between the load bearing race and the diversion track guide means.

* * * * *